April 27, 1965   M. S. MALTENFORT   3,180,914
PRODUCTION OF THIN WALLED RUBBER ARTICLES
Filed Oct. 5, 1961
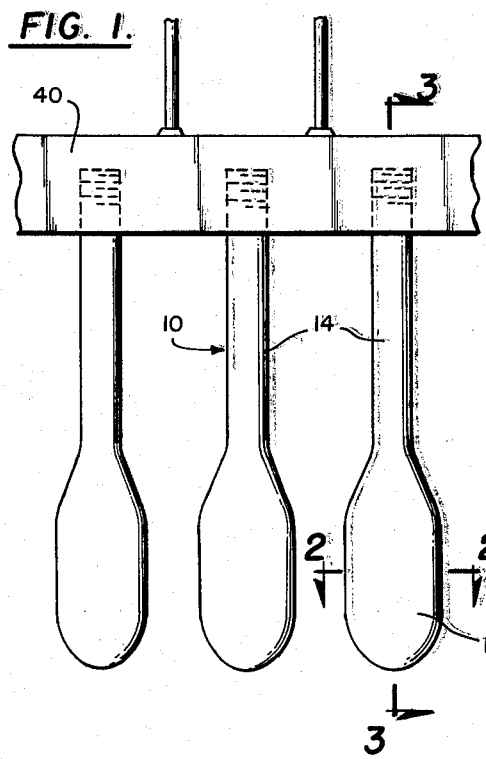
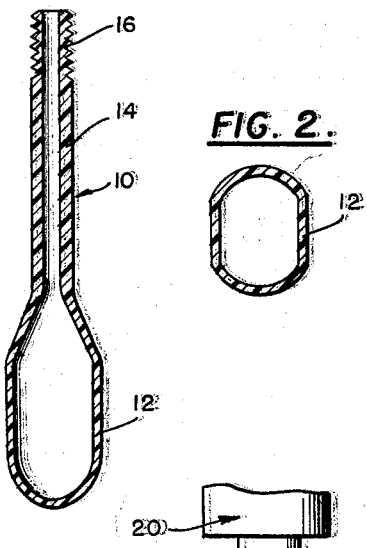
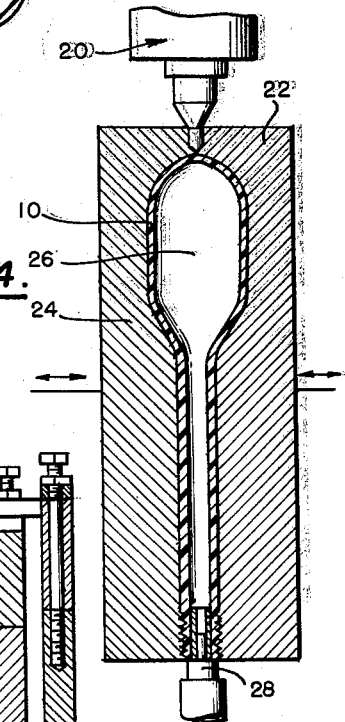
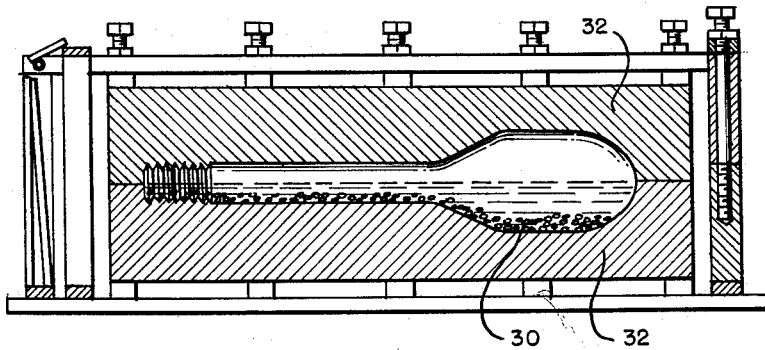
INVENTOR.
Martin S. Maltenfort
BY
ATTORNEYS

United States Patent Office 3,180,914
Patented Apr. 27, 1965

3,180,914
PRODUCTION OF THIN WALLED RUBBER
ARTICLES
Martin S. Maltenfort, Glen Farms, Md.
(7 Crest Road, Newark, Del.)
Filed Oct. 5, 1961, Ser. No. 143,237
6 Claims. (Cl. 264—306)

This invention relates to a form suitable as a means for producing thin walled rubber articles such as balloons, to a method of producing such a form and to the manufacture of balloons or articles of a similar nature utilizing such a form.

Latex dipping, as described in Miller, U.S. Patent No. 2,606,398, is one process for manufacturing rubber articles of the type indicated. Latex dipping as it is generally practiced in the industry comprises preparing a form of suitable configuration, cleaning or otherwise conditioning the surface of the form, coating the form with a coagulant for the latex, preferably by dipping the form into a solution of coagulant, removing the form from the bath, drying the coagulant-coated form either partially or completely, then dipping the form into a suitable latex, removing the form from the latex, drying same and then curing or vulcanizing the rubber article by further heating.

In addition to serving as a physical support and shaping means for the rubber article during the dipping, it will be seen that the form also serves as the support for the article during the drying and heating steps of the process. Thus the form is required to have a combination of properties which are unobtainable with virtually all of the materials which have heretofore been employed for the forms used in the manufacture of toy balloons including metals, glass, wood and synthetic plastic materials, each of which possesses certain advantages and disadvantages as is well understood in the art.

Some of the earliest materials employed for dipping forms were wood, metals, glass, and porcelain. Later thermosetting synthetic resins were used.

Wood while reasonably satisfactory as a physical support, does not have thermal properties which are particularly suitable for the drying, curing or vulcanizing steps of the process. Furthermore the surface, even if highly polished to facilitate stripping, must be continually refinished in order to retain this property, especially since one or more constituents in the wood appear to be chemically reacted upon by the chemicals used in the process. When trying to cure neoprene and other high temperature curing elastomers on wood, or plastic-coated wood, steam develops and cracks the wood or blows off the coating.

Glass or porcelain, even if reinforced with metal inserts (e.g. wire mesh) were too susceptible to breakage and chipping to be extensively adopted, even though they exhibited a relatively greater inertness toward chemical attack and reasonably good stripping properties.

Metal forms possess a combination of ruggedness and low first cost but they are not entirely free from disadvantages in the present uses. First of all metal forms, even if hollow, usually weigh considerably more than non-metal forms. Since in many installations a gang of forms is mounted for dipping at a single time, the power required to move the extra weight becomes significant over repeated operation. Furthermore, unless a very highly corrosion-resistant material such as stainless steel is utilized, and this is relatively expensive, the metal forms are found to become pitted or otherwise become roughened due to the attack of the chemicals used in the baths into which they are dipped, and as a result the original unblemished smooth mirror-like surface from which the rubber articles are readily stripped is soon transformed into a roughened chemically scarred surface from which a progressively greater percentage of unsatisfactory product is obtained. Unless the metal forms are repeatedly cleaned and unless the finish is restored by buffing and/or electroplating and buffing, the forms must be replaced in order to maintain the yield in the process. Furthermore, it is desirable that heat remain in the latex coating and not be transferred to the form. Metal acts as a heat sink which must be brought up to temperature before the rubber coating can get up to temperature for curing.

In an effort to avoid the disadvantages inherent in each of the above noted prior art materials, the art turned to synthetic plastics and specific mention of various plastics for the purpose is found in Stringfield, U.S. 1,472,256 (pyroxylin), Miller U.S. 2,606,398 (thermoset resin), Killian U.S. 2,649,619 (Bakelite), Miller et al. 2,867,647 (melamine resin or nylon), and Schneider 2,908,040 (cellulose acetate butyrate) and in other patents. When utilizing thermosetting synthetic resins, particularly in the shape of a hollow form such as is shown in the drawings accompanying this specification, a considerable difficulty was experienced when attempts were made to mass-produce the forms, e.g. by compression-molding, due to the elongated body, narrow neck, and somewhat restricted orifice therein. Other conventional molding techniques commonly employed with thermosetting resinous polymers, e.g. casting or compression molding were found to be equally unsatisfactory. Hollow injection molded parts of this configuration would almost certainly have to be assembled from two halves, thus presenting the danger of leakage. In addition, when the forms were worn out they had little value as scrap and could not be salvaged. But an even greater disadvantage was experienced when these materials were used as the dip forms, namely release of the rubber article was noticeably poor unless a parting agent was applied to the form before the coagulant dip. This appears to be common to all "polar" synthetic resin polymers and hence to virtually all of the thermosetting synthetic resin polymers commonly used commercially.

One purpose of this invention is to provide a low-cost hollow dip form having good chemical resistance, high-strength, low-weight, good impact resistance, good thermal properties during the curing steps, and which is formed of material which can be salvaged in the event that the form becomes obsolete or damaged.

The present invention is directed to a specific class of materials which are light in weight as compared with metals, resistant to chemical attack by the constituents of the various dipping baths, and which may be readily molded into the desired shapes by simple and inexpensive techniques, and which may be readily salvaged when a run of a particular shape is completed. But what is even more important, the dipping forms of the present invention are made of materials from which the finished rubber articles are readily separated, stripped or released, and which are waxy materials to which so little of the latex would normally adhere as to be heretofore considered of no utility in this field. The synthetic resin polymeric materials which exhibit this desirable combination of properties are non-polar polymers of vinylidene ($>C=C<$) monomers and particularly linear polyolefins of relatively high molecular weights, or polymerized fluorinated olefins such Teflon and similar inert fluorinated hydrocarbon polymers. Of course it will be understood that the material comprising the dipping form is one which retains its shape at the temperatures commonly utilized for curing the rubber article. In order to utilize these materials in the manner hereinafter disclosed, both the process of latex dipping and the compositions employed have been modified in specific aspects.

In the drawings forming a part of this specification,
FIGURE 1 is a schematic view of a dipping form showing the manner in which it is mounted in a carrier or support;

FIGURES 2 and 3 are sectional views of the same form taken along planes 2—2 and 3—3; and FIGURES 4 and 5 are schematic views of two modes of preparing the dipping form of FIGURE 1.

As shown in the figures, the dipping form 10 consists of a hollow bulbous body portion of about 2¾ inches in length and 1¾ inches in diameter which merges with an elongated tubular shank 14 approximately 6½ inches long preferably terminating in a threaded neck 16, ⅝ inch in diameter and having a central bore 18 and carrying external threads adapted to be screwed in the usual way into a mold carrying plate 40 (FIGURE 1).

The form shown in the figures may be inexpensively mass produced by conventional blow molding, shown schematically in FIGURE 4 wherein the apparatus includes an extruder 20 to provide a continuous or intermittent flow of polymer to one end of the cavity 26 of a blow mold consisting of two halves 22, 24. Cavity 26 is closed at the opposite end by a blow pin 28. The blow molding per se may be effected in any conventional or known apparatus and forms no part of the present invention.

The dipping forms of the present invention may also be produced by rotational molding, utilizing the apparatus of FIGURE 5, e.g. by charging powdered solid thermoplastic material 30 into a mold 32 supported by means (not shown) in a machine in which it may be subjected to rotation about a plurality of axes. By heating the mold 32 and its contents 30 to a temperature sufficient to melt the solid thermoplastic material and thereafter simultaneously rotating the mold about horizontal and vertical axes, or other axis, a hollow molding is produced with wall thicknessess controlled within narrow limits according to the amount of charge and the relative rotational speeds.

The advantages of the present invention will be better understood by comparison of the results obtained in a production run making balloons using a blow molded linear polyethylene form as compared with the previously practiced process using hollow aluminum dipping forms of the same external dimensions.

Aluminum forms: | Polyethylene forms
(1) Clean with inhibited alkalies _____ | No cleaning needed.
(2) Rinse with water _____ | No rinse needed.
(3) Apply talc slurry (parting agent) _____ | Talc in coagulant.
(4) Dry _____ | Not needed.
(5) Dip in coagulant _____ | Dip in coagulant.
(6) Dry _____ | Dry (optional).
(7) Dip in rubber latex _____ | Dip in rubber latex.
(8) Dry and cure (180–190° F.) _____ | Dry and cure.
(9) Leach with hot water to remove coagulant _____ | Leach.
(10) Strip from form _____ | Strip.

With the polyethylene forms the percentage of rejects was decreased to about one-fifth of the percentage of rejects using aluminum forms.

If it is found that the heat capacity is not high enough for the form to provide a good heat sink during the curing step, it is possible to add metal flake to the polymer from which the dipping form is molded, e.g. as taught in Novak 2,956,039 to increase the heat capacity of the dipping form.

Furthermore since forms made of non-polar polymers repel all aqueous liquids and even most non-aqueous liquids, when using forms made from non-polar polymers, it has been found desirable to add a wetting agent to the natural rubber latex, to decrease the tendency of the latex to pull away or crawl into bubbles on the form.

One coagulant formulation which was found to be quite satisfactory when used with polyethylene dipping forms comprised the following which includes three ingredients not usually present in the coagulants formulated for use with aluminum dip forms, namely the surface active agent, the antifoaming agent, and the thickening agent.

| Ingredient | Parts by weight | |
|---|---|---|
| | Specific | Range |
| Calcium Nitrate | 25 | 20–35 |
| Water | 52.5 | 40–60 |
| Denatured Ethyl Alcohol | 17.5 | 15–20 |
| Surface Active Agent (Pluronic L-62 Wyandotte Chemical) (Product of condensing ethylene oxide with a hydrophobic base formed by condensation of propylene oxide with propylene glycol.) | 1 | 0.2–1.5 |
| Talc | 5 | 0–5 |
| Methocel, 4,000 cps | 0.25 | 0.25–1.0 |
| Silicone (Dow Corning Antifoam B) | 0.05 | 0.01–0.5 |

The preparation of this coagulant was as follows:

The water and alcohol are mixed, surface active agent and talc are added. Calcium nitrate is placed in a porous cloth bag and suspended in the solution until thoroughly dissolved. A small portion of the solution is heated to about 180° F. and the Methocel (4,000 cps.) stirred in. This is added slowly to the batch and stirred until dissolved.

It has further been found that the surface active agent can aid in the coagulation of the latex. If the latex is cationic in nature, the use of an anionic surfactant will cause coagulation and reduce the amount of calcium nitrate required. Conversely, if the latex is anionic, the use of a cationic surfactant will aid coagulation, again reducing the calcium nitrate requirement.

An additional benefit derived from the use of a surface active agent is that coagulation takes place at an increased rate. This is probably due to more rapid molecular diffusion of the calcium nitrate ions into the latex.

In addition to linear polyethylene, other thermoplastics which have been found to possess the desired combination of strength, impact resistance, chemical inertness toward the materials being processed, light weight, etc., include polypropylenes, Teflons and other polyolefins.

While all polyolefins have the desired release properties for the present process, only the linear types have high enough distortion temperatures to withstand the temperature of the rubber curing cycles.

A particular benefit derived from the addition of a thickening agent, added to increase the film strength of the coagulant, is that it has been found to increase the strength of the coagulant film to such an extent that it is not necessary to dry the coagulant coated form before dipping into the latex. Thus wet forms may be dipped directly into the rubber latex without the film washing away. Instead of Methocel (methylcellulose) other thickening agents which may be used include sodium carboxymethylcellulose, natural gums, polyacrylates, modified bentonite clays and the like.

Having now described preferred embodiments of the invention, it is not intended that it be limited except as required by the appended claims.

I claim:

1. A process of latex dipping which comprises: coating a form which retains its shape at the temperatures commonly utilized for curing the resulting rubber articles and which is composed of a non-polar thermoplastic material selected from the group consisting of relatively high molecular weight polyolefins and fluorinated hydrocarbon polymers by applying a coagulant thereto, said coagulant comprising the following in parts by weight:

| | |
|---|---|
| Calcium nitrate | 20–35 |
| Water | 40–60 |
| Lower alcohol | 15–20 |
| Surface active agent | 0.2–1.5 |
| Talc | 0–5 |
| Thickening agent | 0.25–1.0 |
| Antifoaming agent | 0.01–0.5 | to produce a form carrying a coagulant layer thereon, thereafter dipping the coagulant coated form into a rubber latex; withdrawing the form from the latex after a thin coagulated layer of rubber has formed on the surface of the form; drying and curing the rubber layer and thereafter stripping the thin walled rubber article from the form.

2. In latex dipping by the process of claim 1, the improvement which comprises utilizing as the material from which the dipping form is made, a non-polar thermoplastic synthetic relatively high molecular weight polymer of an olefin which retains its shape at the temperatures commonly utilized for curing the resulting rubber articles.

3. The method of claim 1 wherein the coagulant coated form is dipped into the rubber latex before the coating of coagulant has dried.

4. The process of claim 1 wherein the coagulant includes a surface active agent which assists in coagulation of the latex.

5. A form for producing thin walled rubber articles by dipping, said form consisting of a hollow bulbous body portion and an elongated tubular shank integral therewith, extending from one end of said bulbous portion and having a central core continuous with the cavity in said bulbous portion, said dipping form being composed of a non-polar thermoplastic synthetic relatively molecular weight polyolefin which retains its shape at the temperatures commonly utilized for curing the resulting rubber articles.

6. A blow-molded form for producing thin walled rubber articles by dipping, said form consisting of a hollow bulbous body portion and an elongated tubular shank integral therewith, extending from one end of said bulbous portion and having a central bore continuous with the cavity in said bulbous portion, said dipping form being composed of a non-polar thermoplastic synthetic relatively high molecular weight polyolefin which retains its shape at the temperatures commonly utilized for curing the resulting rubber articles.

References Cited by the Examiner
UNITED STATES PATENTS

| | | | |
|---|---|---|---|
| 1,472,256 | 10/23 | Stringfield | 18—41 |
| 2,315,310 | 3/43 | Bitter et al. | 18—41 |
| 2,326,160 | 8/43 | Neiley et al. | 18—58.6 |
| 2,392,825 | 1/46 | MacLeod | 260—815 |
| 2,552,027 | 5/51 | Bird et al. | 18—47 |
| 2,830,325 | 4/58 | Bray | 18—47 |
| 2,842,606 | 7/58 | Stoner et al. | 260—815 |
| 2,854,695 | 10/58 | Moreau | 18—41 |
| 2,867,847 | 1/59 | Miller et al. | 18—41 |
| 2,867,849 | 1/59 | Drew et al. | 18—58.6 |
| 3,017,284 | 1/62 | Lambert et al. | 18—47 |

WILLIAM J. STEPHENSON, *Primary Examiner.*

MICHAEL V. BRINDISI, *Examiner.*